(12) United States Patent
McClure

(10) Patent No.: US 7,300,042 B2
(45) Date of Patent: Nov. 27, 2007

(54) RADIAL-TYPE TEMPORARY FASTENER, COMPONENTS AND TOOL

(76) Inventor: Travis D. McClure, 140 9th Ave., Kirkland, WA (US) 98033

( * ) Notice: Subject to any disclaimer, the term of this patent is extended or adjusted under 35 U.S.C. 154(b) by 0 days.

(21) Appl. No.: 11/069,218

(22) Filed: Feb. 28, 2005

(65) Prior Publication Data

US 2005/0200066 A1    Sep. 15, 2005

Related U.S. Application Data

(63) Continuation-in-part of application No. PCT/US03/27359, filed on Aug. 29, 2003.

(60) Provisional application No. 60/407,529, filed on Aug. 30, 2002.

(51) Int. Cl.
*B66F 7/26* (2006.01)

(52) U.S. Cl. .................. 269/49; 269/309; 279/9.1; 279/143

(58) Field of Classification Search ............. 269/309, 269/49, 73, 71; 279/9.1, 51, 143
See application file for complete search history.

(56) References Cited

U.S. PATENT DOCUMENTS

| 3,424,050 | A | * | 1/1969 | Burrow | ............ 269/48.4 |
| 2004/0075225 | A1 | * | 4/2004 | Heim | ............ 279/9.1 |
| 2004/0206217 | A1 | * | 10/2004 | Weller et al. | ............ 81/310 |

OTHER PUBLICATIONS

International Search Report dated Feb. 17, 2004 relating to PCT Application No. PCT/US03/27359.

* cited by examiner

*Primary Examiner*—Lee D. Wilson
(74) *Attorney, Agent, or Firm*—Graybeal Jackson Haley LLP

(57) ABSTRACT

A temporary fastener tool (20) for establishing and maintaining compressive alignment between at least two parts, each having an aperture through which the fastener tool is inserted. The tool includes a spindle (120) having a first and second end wherein a bulbous element (126) extends from the first end. The spindle engages collet (100) that includes a plurality of finger elements (106).

58 Claims, 5 Drawing Sheets

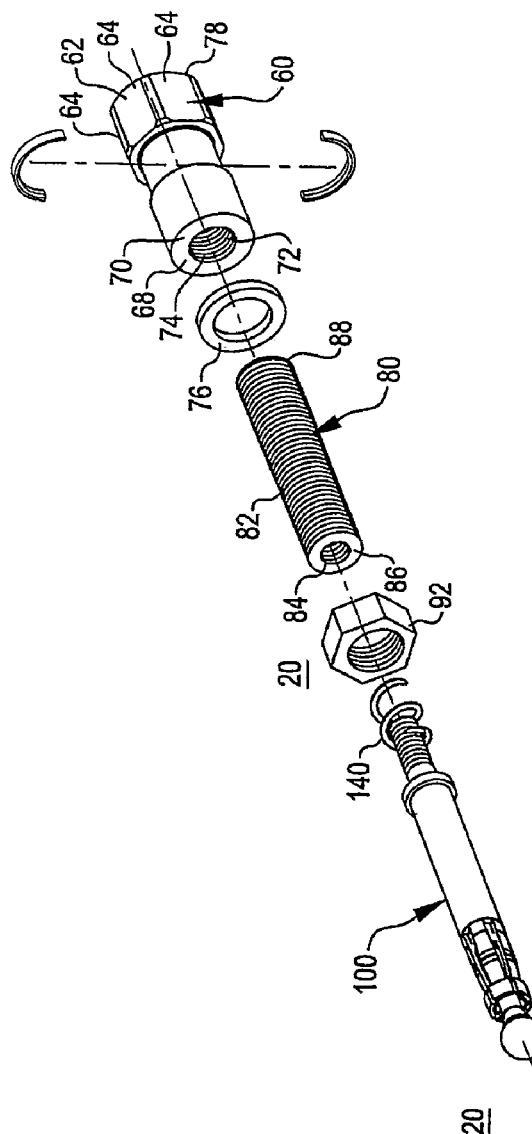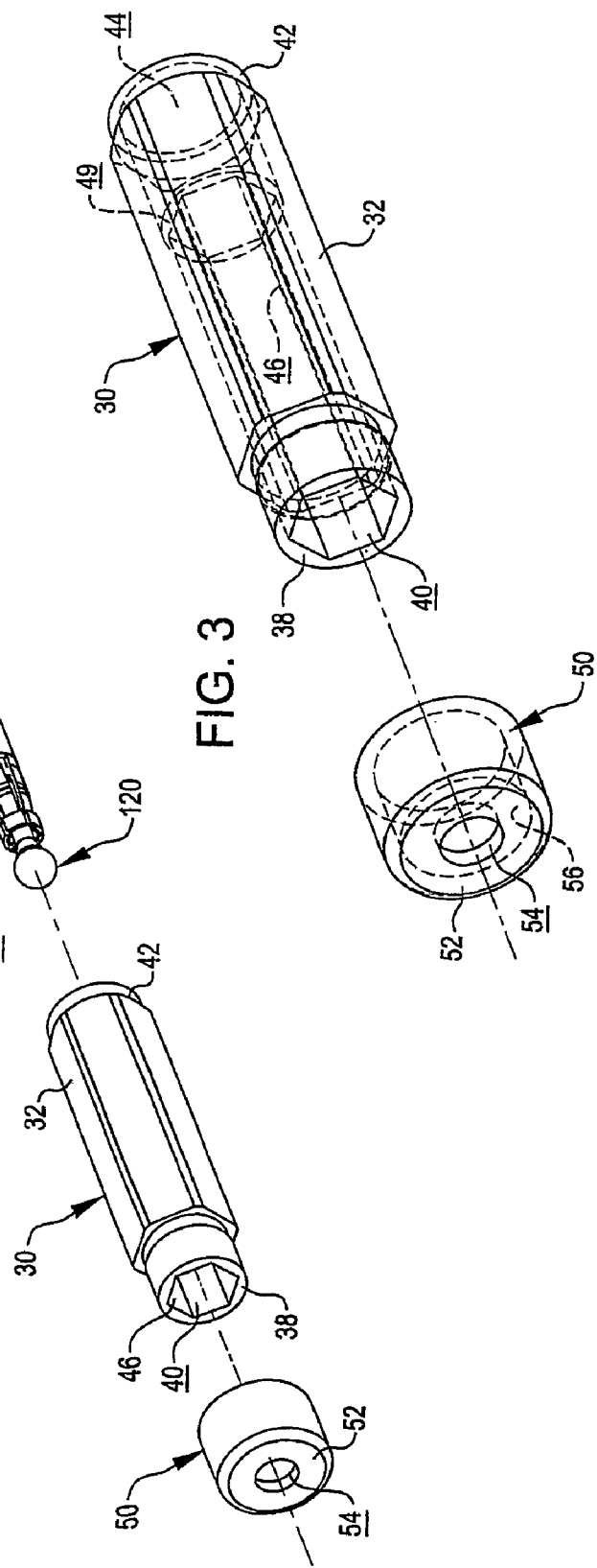

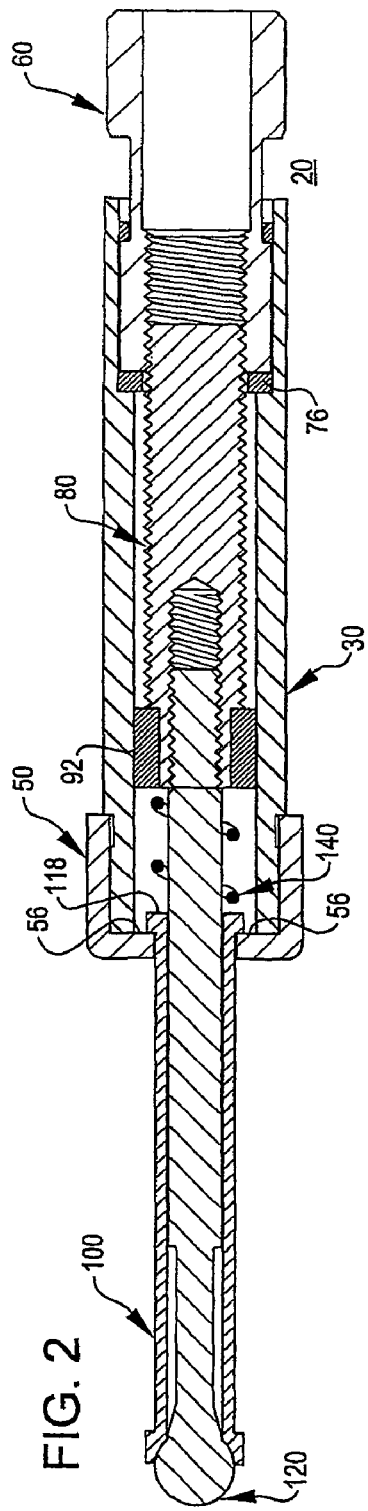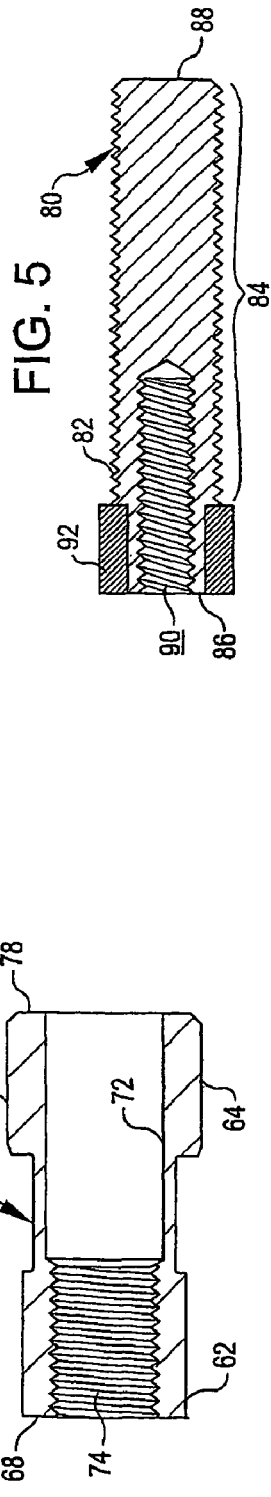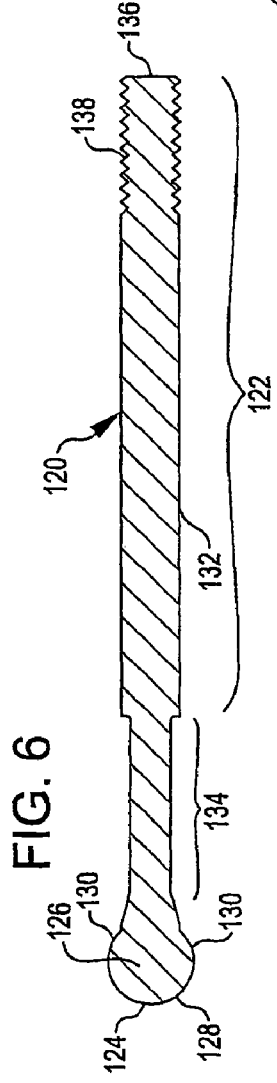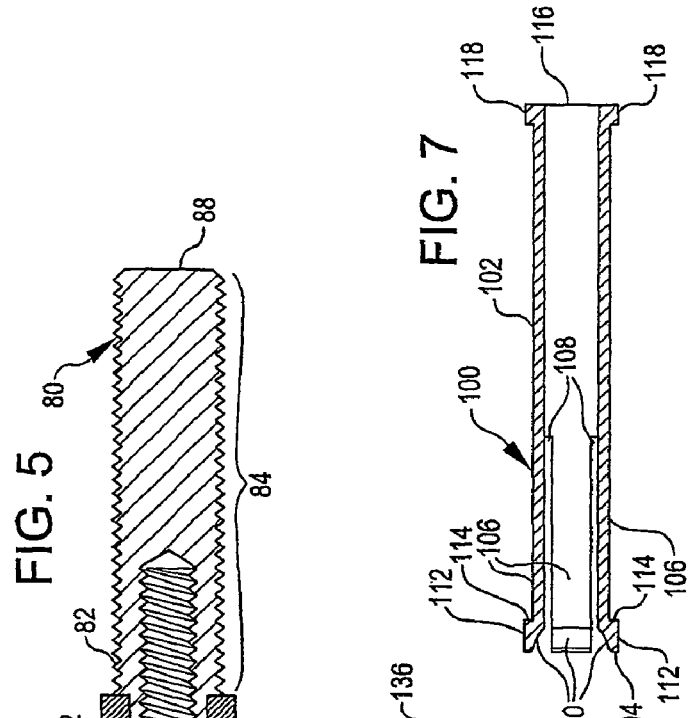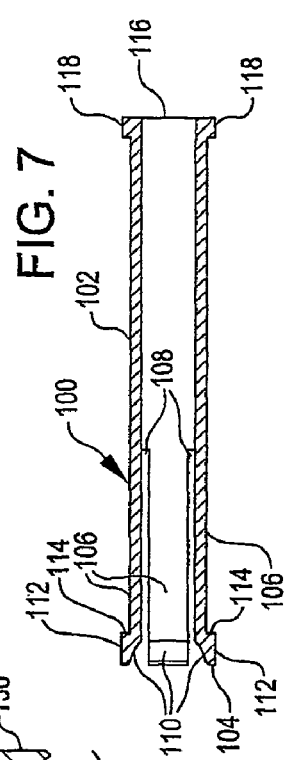

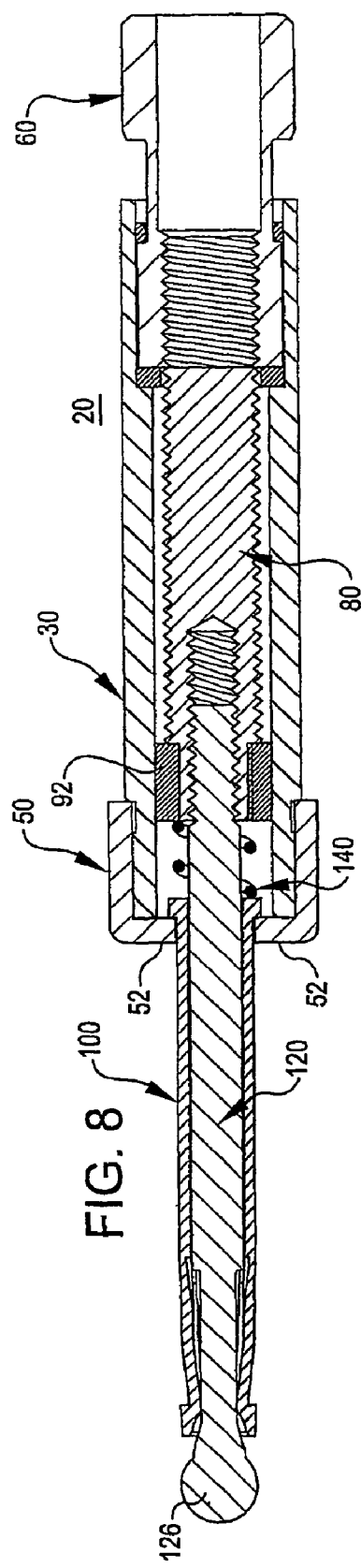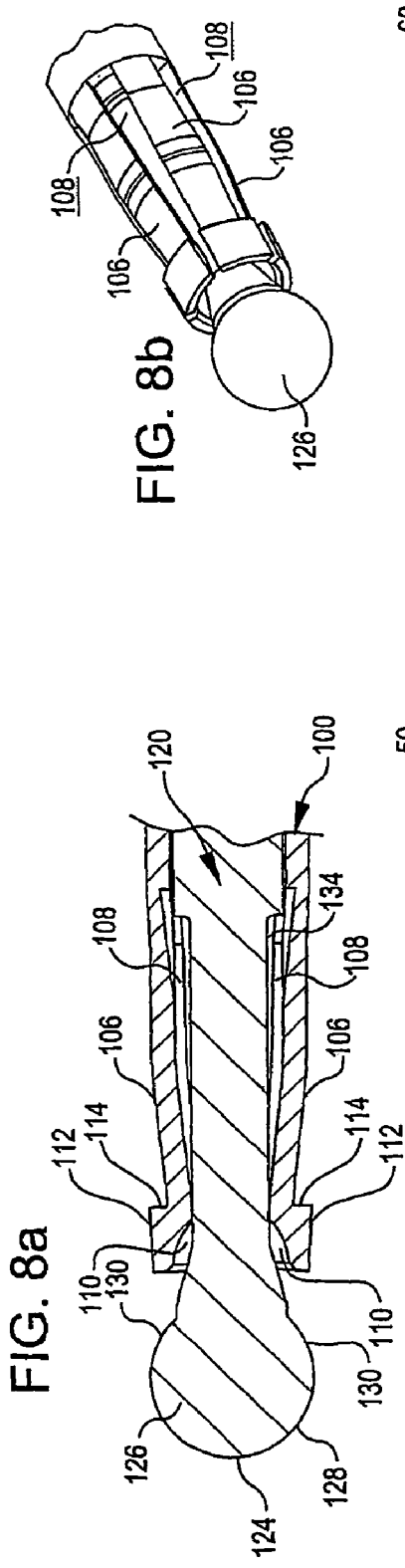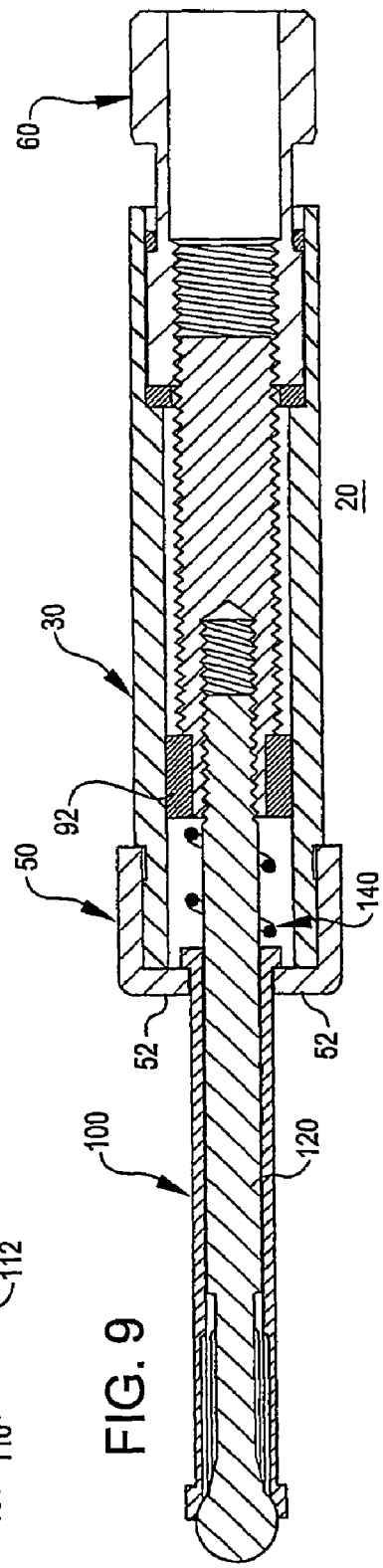

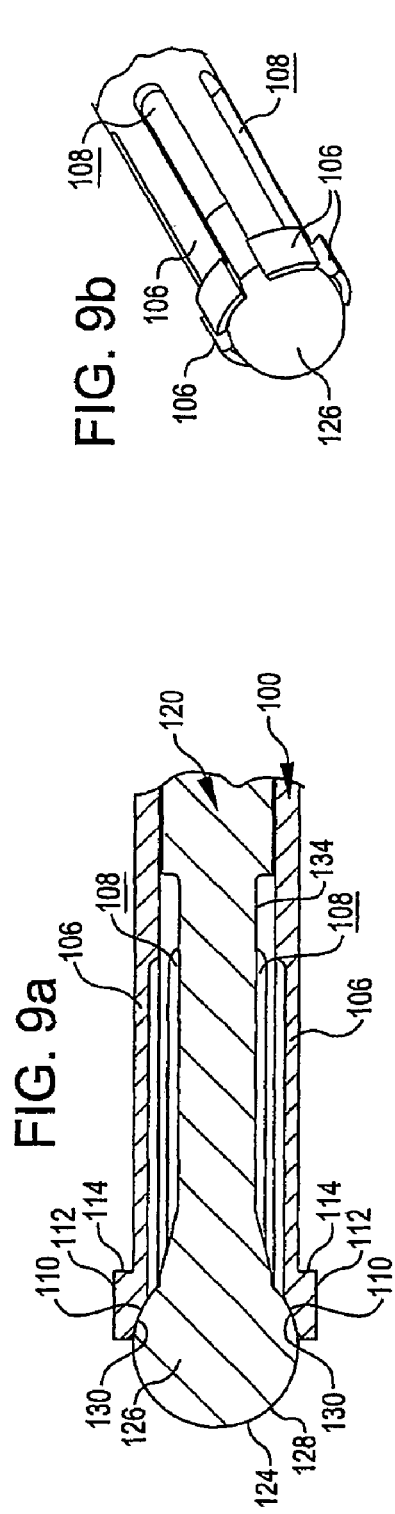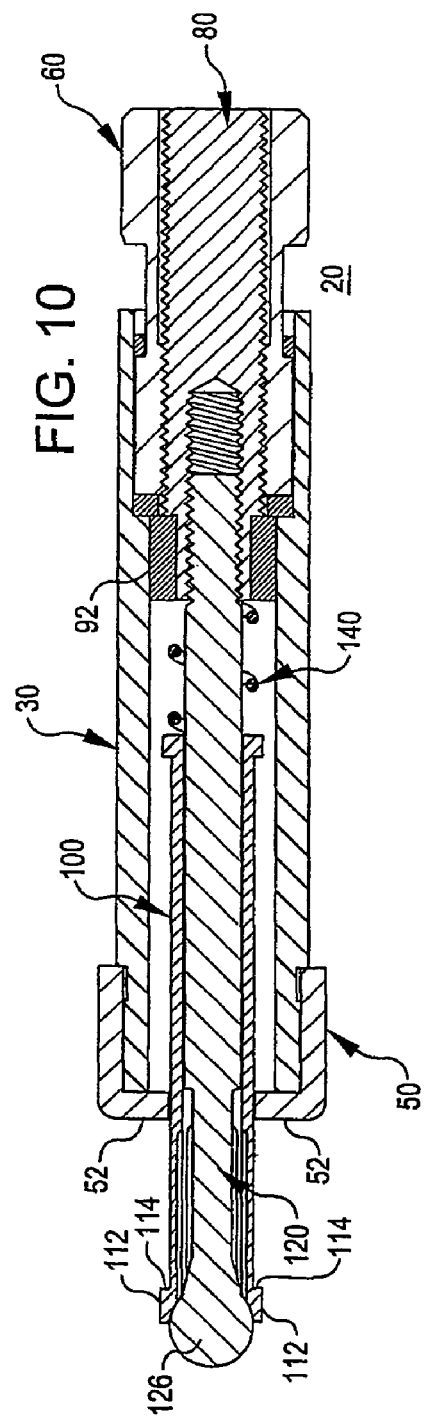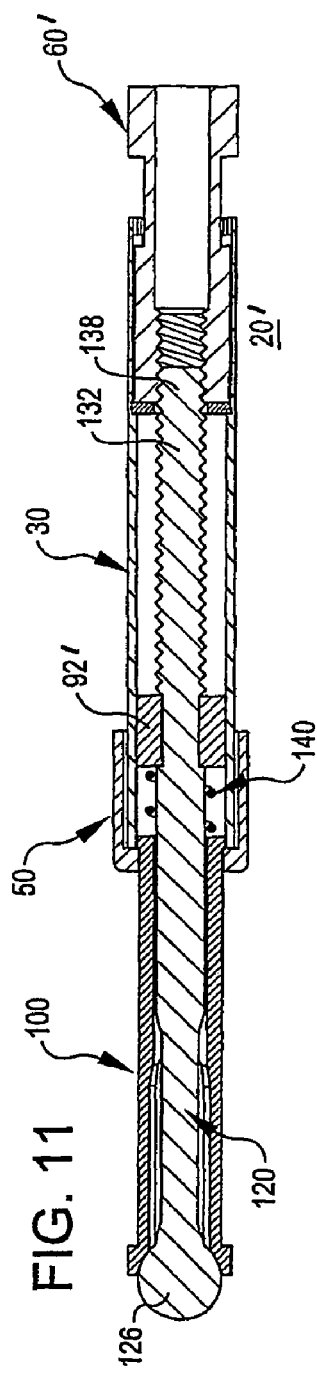

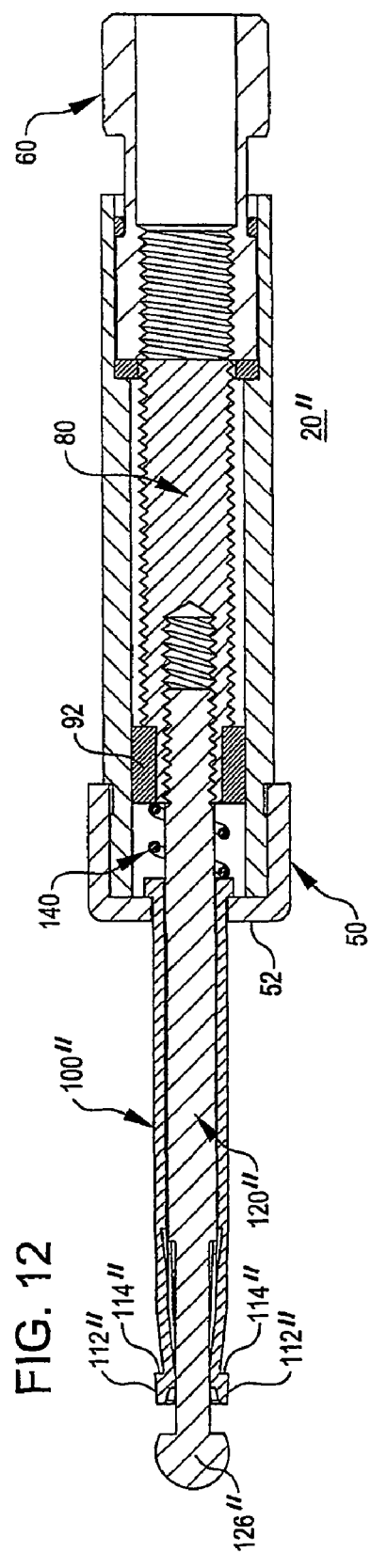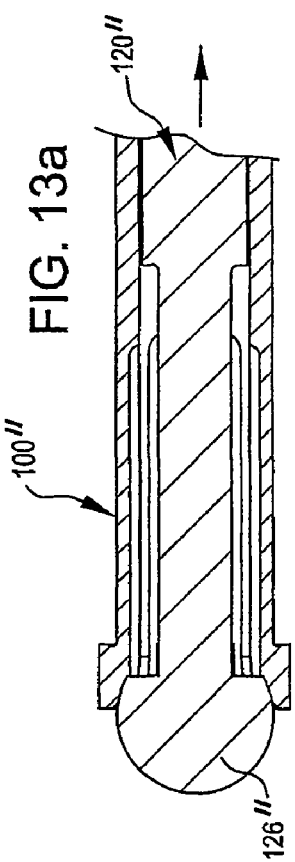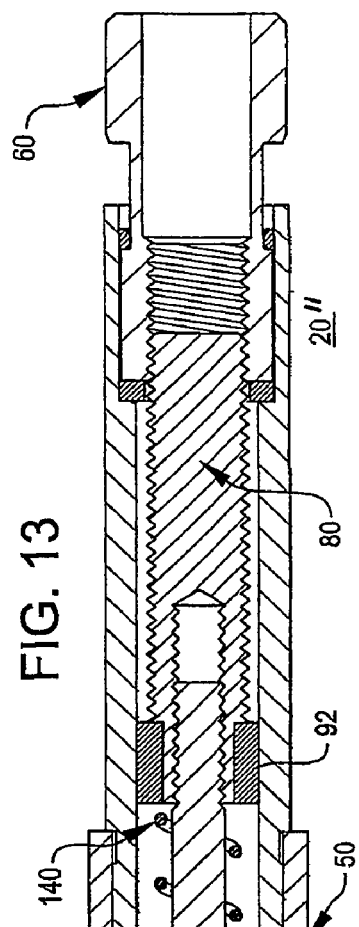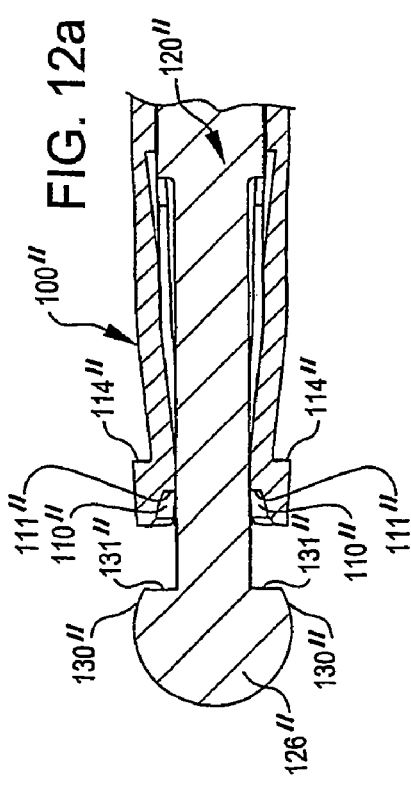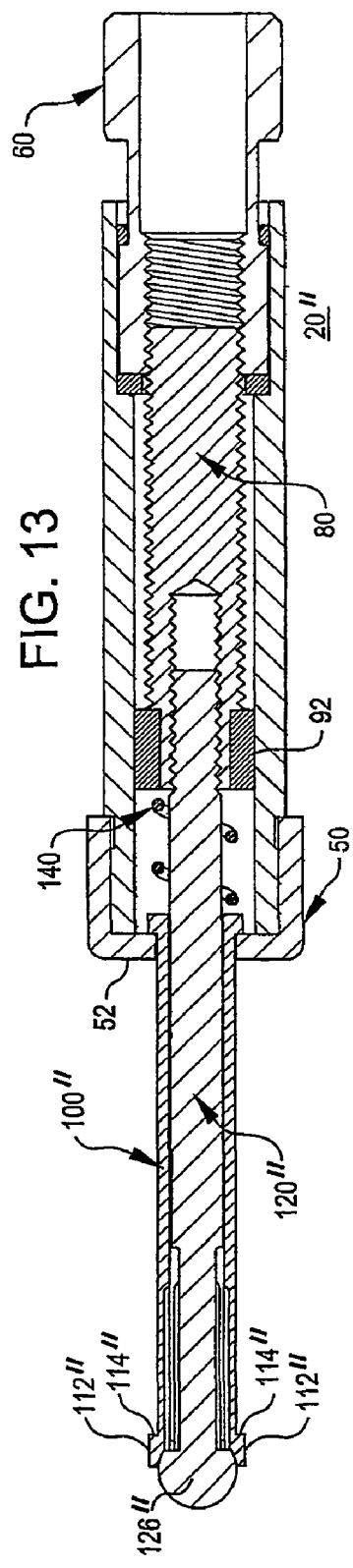

RADIAL-TYPE TEMPORARY FASTENER, COMPONENTS AND TOOL

CROSS-REFERENCE TO RELATED APPLICATION

This application is a continuation-in-part of the PCT Application No. PCT/US03/27359, filed 29 Aug. 2003, which is herein incorporated by reference, that claims priority from U.S. Provisional Patent Application No. 60/407, 529 filed 30 Aug. 2002, which is herein incorporated by reference. This application claims the benefit of the filing date of the PCT Application under 35 USC §120; and claims priority from the U.S. Provisional Application under 35 USC §119(e).

DESCRIPTION OF THE PRIOR ART

Prior art wedge-type fasteners used to hold two or more apertured and aligned parts together are well known. These fasteners, which are intended to temporarily compress the parts together so as to allow a more permanent means for fastening the parts via other apertures, comprise two types: wire wedge-type fasteners and radial wedge-type fasteners. The later, being particularly suited for high-stressapplications, are fairly represented in U.S. Pat. No. 6,056,283, which is incorporated herein by reference.

Using the embodiments shown in the '283 patent as a reference, it can be seen that this type of temporary fastener includes certain inherent deficiencies. One deficiency is that torque applied to a nut that causes translation of the spreader and stem also causes a torque moment to appear in the tubular body tangs. The result is that the tangs rotate or cause a torque moment to appear in one or more of the parts to which the tool is applied. As a result, both the tangs and the part(s) are subject to deformation.

Another deficiency relates to non-perpendicular aperture alignment with respect to the panels to be joined. The existing tools don't allow for the tangs or fingers to fully expand and compressively fill the apertures of the parts to be fastened. This results in damage to both the parts as well as, over time, the tool.

In addition to the foregoing, in many of the prior art temporary fasteners the spreader does not uniformly contact the tangs nor fully contact the tangs. Again, damage to the tool or parts is often the result.

SUMMARY OF THE INVENTION

Embodiments comprising the invention are directed to temporary fastener tools for establishing and maintaining compressive alignment between at least two parts, each having an aperture through which the fastener tool is inserted. In addition, the invention is embodied in components of the temporary fastener tool, as well as methods of making and using the temporary fastener tool. A feature of a temporary fastener tool comprising the invention relates to the isolation of expandable collet fingers or tangs from all forms of torque that may result from application of the tool to the work pieces during use. Another feature of the temporary fastener tool comprising the invention relates to the use of a ball and socket configuration as the interface between a spreading element and the collet fingers or tangs. As will be set forth in greater detail below, the invention is manifest in a variety of embodiments.

Each temporary fastener tool embodiment comprises certain elements common to one another, although specific attributes thereof may vary. In each embodiment, a tool incorporating the invention comprises an elongated, generally cylindrical main body that has a first end, a second end, an interior surface and an exterior surface wherein the first end defines an orifice. The orifice may be formed as part of the main body, or may be defined by an end cap that has been secured (either permanently or temporarily) to the first end of the main body. The orifice preferably has a diameter less than the nominal interior diameter of the main body.

The tool of the invention also comprises a spindle. The spindle includes a first or distal end, a second or proximal end, and an exterior surface wherein a bulbous or spreading element extends from the first or distal end. The bulbous element comprises a head portion and a collet contacting portion. In one series of embodiments, the collet contacting portion further comprises a convex surface (preferably as part of a spheroid or frusto-spheroid), which, as will be described in detail below, permits uniform contact with and force distribution to the collet finger or tang interior surfaces. Depending upon the embodiment wherein the spindle is used, a portion of the exterior surface has threads formed at least at or near the second or proximal end; in other embodiments it does not. If threaded, the threads may engage complimentary threads formed in a bushing (desirable when the spindle is of a relatively small diameter) or may engage complementary threads formed in a driving element. In any embodiment, at least a portion of the spindle is sized to fit and axially translate within the main body.

Lastly, any tool embodiment incorporating the invention includes a collet located in and extending through the main body orifice, the collet comprises a plurality of finger or tang elements at a first or distal end, an abutment at a second or proximal end, an interior surface and an exterior surface, and is sized to receive at least a portion of the spindle. Each of the finger elements are defined by a plurality of slots extending from the first end towards the second end; at least two of the fingers include shoulder portions for contacting a work piece to be fastened. In one series of embodiments, each finger element also comprises a concave interior portion at its distal end. This portion is preferably complementary to a convex contacting surface of the bulbous element. Preferably, each finger element will also have a converging bias so that the distal portions radially converge when the bulbous element is not in contact with the finger elements. To facilitate this convergence, it may also be desirable to reduce the diameter of the spindle at the distal end just before reaching the bulbous element.

In any tool embodiment, it is necessary to axially translate the spindle from the first or distal end of the tool to the second or proximal end. In so doing, the bulbous element engages with the distal end of the collet, thereby radially spreading the fingers. Thus, any means known to those persons skilled in the art for imparting such an axial movement is considered within the scope of the invention, and include incorporating a component within the tool for causing axial translation, e.g., a screw jack linkage, or utilizing an auxiliary translation means such as a pneumatic rivet gun and the like.

In selected embodiments, it is preferably to arrest spindle rotation because pure axial movement is considered desirable. Thus, an anti-rotation means is used. The anti-rotation means preferably directly or indirectly interacts with the spindle and the main body. In its broadest form, a selective cross section of the main body reveals a non-circular geometric shape that is constant along at least a portion of the main body axis. Similarly, a complementary geometric shape is associated with the spindle or other element linked to the spindle (such as a bushing) so as to permit axial translation thereof through the main body, but not rotation of the spindle or other element within the main body interior.

In a first preferred embodiment, which is directed to large diameter aperture applications, the temporary fastener tool embodying the invention comprises a spindle that is threaded on its proximal or second end. These threads engage a drive element or drive nut, which is freely rotatable in, yet held captive by, the main body or structure associated therewith. The drive element is characterized generally as a cylindrical body and includes internal threads complementary to the spindle threads. Upon rotation of the drive element, the spindle is caused to axially translate towards the second end of the main body. Torque directed to the spindle may be arrested by using a means for preventing induced rotation, such as a key and slot arrangement; or a geometric form attached to or incorporated into the spindle, the form having facets or lobes (any non-radial constant cross section) with a complementary pattern formed in the interior surface of the main body among others. In an illustrated embodiment, a hexagonal geometric form is used.

In a second preferred embodiment, which is directed to small diameter aperture applications, the temporary fastener tool embodying the invention comprises a spindle linked to a bushing, which operates to increase the spindle diameter so that a suitable driving linkage can be used to cause axial translation of the spindle. In such an embodiment, the primary function of the bushing is to increase the diameter of the spindle assembly so that it may more effectively receive the rotational impetus imparted by a drive element if threaded or axial impetus provided by additional structure. In addition, the use of a uniform outer diameter bushing permits one to use the same main body and, for example, drive element. The only portions that then need modification are the spindle, the collet, and the end cap, if present.

In a third preferred embodiment, which is directed to applications having a generally consistent parts depth, the temporary fastener tool embodying the invention dispenses with using a screw jack arrangement (drive element or drive nut rotationally engaging the bushing or spindle) to cause axial translation of the spindle, and instead relies upon a cam body operatively linked (either directly or indirectly) to the spindle.

In a fourth preferred embodiment, no intrinsic means are provided for causing axial translation of the spindle. In this embodiment, the tool may be subsequently adapted for use by mechanical, pneumatic or hydraulic auxiliary apparatus capable of either imparting axial or rotational force to the spindle wherein the spindle may be adapted for such use.

The primary wear components of tools incorporating the invention are the collet and the spindle. Consequently, certain benefits of the invention can be realized by replacing worn components with the collet and spindle, or retrofitting existing temporary fastener tools with the collet and spindle of the invention.

BRIEF DESCRIPTION OF THE DRAWINGS

FIG. 1 is an exploded perspective view of a first embodiment of the temporary fastener illustrating the invention;

FIG. 2 is an elevation view in cross section of the embodiment of FIG. 1;

FIG. 3 is a detailed cross sectional view of the main body and end cap of the first embodiment;

FIG. 4 is a detailed cross sectional view of the driving nut of the first embodiment;

FIG. 5 is a detailed cross sectional view of the bushing of the first embodiment;

FIG. 6 is a detailed cross sectional view of the spindle of the first embodiment;

FIG. 7 is a detailed cross sectional view of the collet of the first embodiment;

FIG. 8 is an elevation view in cross section of the first embodiment illustrating the lack of interaction between the spindle and the collet prior to operation of the tool;

FIG. 8*a* is a detailed cross sectional view of the spindle prior to interacting with the collet;

FIG. 8*b* is a perspective view of the spindle prior to interacting with the collet;

FIG. 9 is an elevation view in cross section of the first embodiment illustrating the initial engagement between the spindle and the collet;

FIG. 9*a* is a detailed cross sectional view of the spindle interacting with the collet at full engagement;

FIG. 9*b* is a perspective view of the spindle interacting with the collet at full engagement;

FIG. 10 is an elevation view in cross section of the first embodiment showing a work piece depth adjusting feature when the collet retracts into the main body;

FIG. 11 is an elevation view in cross section of a second embodiment illustrating the invention wherein only a spindle is used;

FIG. 12 is an elevation view in cross section of a third embodiment illustrating the lack of interaction between the spindle and the collet prior to operation of the tool wherein a frusto-spheroid comprises the bulbous element;

FIG. 12*a* is a detailed cross sectional view of the spindle prior to interacting with the collet;

FIG. 13 is an elevation view in cross section of the third embodiment illustrating the initial engagement between the spindle and the collet; and FIG. 13*a* is a detailed cross sectional view of the spindle interacting with the collet.

DESCRIPTION OF THE PREFERRED EMBODIMENTS

The following discussion is presented to enable a person skilled in the art to make and use the invention. Various modifications to the preferred embodiment will be readily apparent to those skilled in the art, and the generic principles herein may be applied to other embodiments and applications without departing from the spirit and scope of the present invention as defined by the appended claims. Thus, the present invention is not intended to be limited to the embodiment show, but is to be accorded the widest scope consistent with the principles and features disclosed herein.

Turning then to the several Figures wherein like numerals indicate like parts, and more particularly to FIGS. 1 and 2, a first temporary fastener or tool 20 is shown. Tool 20 comprises the following major components, which are preferably constructed from a metal alloy such as tools steels, e.g., 4140, 4340, A2, O1, 17-7 stainless, 17-4 stainless, or 440C stainless, the ultimate composition depending upon design parameters: main body 30, end cap 50, drive nut 60, bushing 80, collet 100, spindle 120 and spring 140. In this embodiment, it is desired to torsionally isolate collet 100 and spindle 120 from rotational influence derived from drive nut 60 during operation of tool 20. To accomplish this objective, the interaction of the several major components will now be described.

Turing then to FIG. 3, main body 30 and end cap 50 are shown in detail. Main body 30 includes first end 38, second end 42, interior surface 46 and exterior surface 32, which preferably has a hexagonal cross section over a major portion thereof to permit use of a wrench or other tool should the need to counter main body rotation arise. Main body 30 also includes first reduced diameter portion 34 at end 38, which provides a suitable mounting arrangement for cap 50, and opening 40 through which collet 100 and spindle 120 extend as will be discussed in more detail below. Another opening 44 is present at end 42.

The main portion of interior surface 46 is characterized as having a hexagonal geometry. Towards end 42, the inner diameter is increased to rotationally receive drive nut 60. The result of this increase is the formation of shoulder 48, which limits axial movement of drive nut 60 towards end 38. Axial movement of drive nut 60 is further limited by either using a retaining ring at groove 49 or by rolling end 42 radially inwardly, after insertion of drive nut 60. The objective of these retention means is to prevent axial translation of drive nut 60; thus other means such as use of a threaded retaining nut or a spring clip may be used. As shown, a pair of washers 76 are used and located as shown in this Figure for the purpose of providing a reduced friction surface.

Drive nut 60, which is best shown in FIG. 4, is generally characterized as a cylinder having interior surface 72, which in part defines interior threads 74, although threads 74 may be formed in the entire interior surface 72 depending upon design considerations. Exterior surface 62 in part defines facets 64 at end 78, which are preferably six in number to form a hexagonal geometry. Exterior surface 62 also defines annular shoulder 66 and includes contacting surface 70. Both shoulder 66 and contacting surface 70 provide structure for transmitting axial and rotational forces to main body 30 as is best shown in FIG. 2.

As was shown in FIG. 2, drive nut 60 engages bushing 80 via threads 74 on drive nut 60 and threads 84 formed on exterior surface 82 of bushing 80. Threads 74 preferably extend from first end 86 to second end 88. Disposed on first end 86 is hexagonal stabilizing nut 92, which is preferably permanently attached to busing 80. Nut 92 is sized to axially translate within main body 30 but not rotate. Consequently, torque force presented to bushing 80 via drive nut 60 is countered by main body 30, yet spindle is free to axially translate within main body 30. Those persons skilled in the art will appreciate that any keyed arrangement wherein rotation of busing 80 (or in embodiments wherein only spindle 120 is used, then preventing rotation thereof) is arrested either directly or indirectly by interaction with main body 30 will achieve this objective. Thus, alternative means for preventing rotation include, but are not limited to, any geometric form not having a constant radial section but having a substantially consistent axial profile, e.g., cylinder.

Also present at first end 86 is bore 90, which may be smooth or may be threaded. As will be discussed in greater detail below, bore 90 receives spindle 120, and as such is adapted for this purposes. The fact that spindle 120 is a separate structure is based primarily upon design and cost considerations, as well as addressing parts strength considerations. Consequently, the resulting spindle may be a unitary piece or may be constructed from more than one piece suitably joined together.

Turning next to FIGS. 6 and 7, collet 100 and spindle 120 will now be described. Collet 100 comprises body 102, which includes fingers 106 defined by slots 108 at first or distal end 104, as well as annular abutment 118 at second or proximal end 116. Fingers 106 are preferably converging so that when in a nominal state such as that shown in FIGS. 8, 8a and 8b, they converge towards a portion of spindle 120, and radially expand upon displacement by spindle 120.

Spindle 120 comprises body 122 having first or distal end 124, which includes bulbous element 126, stem 132, and second or proximal end 136. Spindle 120 may be constructed from several pieces such as by attaching (through welding or fusing) a ball bearing to stem 132 at distal end 124, or may be cast or machined from a single piece of suitable material. If the two piece approach is used, the ball bearing is preferably not heat treated and drilled to receive a portion of distal end 124. Thereafter, it is preferably welded or fused to stem 132 and the entire assembly suitably heat treated to increase tensile strength. Ideally, a portion of stem 132 has a reduced diameter portion (shown as 134), which serves to provide a location for converging fingers 106 to occupy when fastener 20 is in a nominal or resting state.

Referring specifically to FIGS. 8, 8a and 8b, it can be seen that bulbous element 126 includes head portion 128 and convex finger contacting portion 130, and that each finger 106 preferably has generally matching concave inner surface 110. This approach, referred to herein as a ball and socket design, advantageously allows for angular misalignment of two surfaces to be compressed, and provides greater strength. Use of a spherical or convex portion at head 128 also facilitates insertion of the tool into a target aperture. Moreover, if fingers 106 are sufficiently flexible, they can axially distort, thereby adapting to the contour of the piece to be clamped. These and other features will be described in more detail below with respect to operation of tool 20.

Lastly, compression spring 140 may be located between bushing 80 and a mechanical ground such as main body 30 to bias bushing 80 towards drive nut 60. As those persons skilled in the art will appreciate, incorporation of spring 140 is not necessary to the operation of the invention, and any means for urging bushing 80 toward drive nut 60 is contemplated. In addition, spring 140 is preferably only in compressive contact with bushing 80 when it is nearly or actually decoupled from drive nut 60.

Earlier, it was noted that a tool embodying the invention need not use a bushing. FIG. 11 illustrates in cross section such a tool 20'. In this second embodiment, at least engaging portion 138 is threaded to engage with complementary threads formed in drive nut 60', and preferably a portion of stem 132 is so threaded. Equally applicable, although not shown, are embodiments that dispense with drive nut 60 or 60', and instead rely upon an auxiliary structure to provide the necessary axial translation of spindle 120.

A third embodiment relying upon a frusto-spheroid for a bulbous element is shown in FIGS. 12, 12a, 13, and 13a. In all respects, tool 20" is similar to tool 20, except the geometry of finger contact portion 130" of spindle 120" is modified as well as complementary inner surface 110" of collet 100". In this embodiment, axial translation of spindle 130" towards second or proximal end 42 of main body 30 is positively arrested by the interaction between wall 131" of bulbous element 126" and wall 111" of fingers 106" as is best shown in FIGS. 12a and 13a. Head 128 remains generally spherical and the interface between bulbous element 126" and fingers 106" remains one of a convex/concave relationship.

It should be apparent to those persons skilled in the art that the means for axial translation prevention show in these Figures can be accomplished by a variety of means, including providing segments or facets instead of an annular wall on the bulbous element (in such an embodiment at least one finger must have a wall opposite of at least one facet).

OPERATION OF THE TOOL

Having described the various elements and features of tool 20, operation thereof will now be described. Turning first to FIGS. 8, 8a and 8b, tool 20 is shown in a nominal or resting state. Bulbous element 126 is positioned away from collet 100 so that fingers 106 are free to converge towards spindle 120. While nominal convergence of fingers 106 is not necessary to the operation of tool 20, it does permit easier insertion of collet 100 into an intended orifice rather than having to exert a radially compressive bias to fingers 106. In addition, bushing 80 is generally disengaged from drive nut 60, but is in compressive contact therewith by way of spring 140.

Turning next to FIGS. 9, 9a and 9b, tool 20 is shown in a first engaged position. Here, rotation of drive nut 60 while holding main body 30 stationary has caused axial translation of bushing 80 and spindle 120 towards the proximal end of tool 20. The interaction between stabilizing nut 92 and interior surface 46 of main body 30 (refer to FIG. 1) has prevented rotation of bushing 80 and spindle 120 within main body 30. Initial resistance to further axial translation was encountered when converged fingers 106 contacted bulbous element 126 at convex finger contact portion 130. However, because fingers 106 include a chamfer and concave inner surface 110, minimal further resistance to axial translation was then encountered. As a result, bulbous element 126 continued translation and fingers 106 were urged radially outward, overcoming the converging bias established by fingers 106 prior to expansion.

Expansion of fingers 106 via axial translation continued until either maximum desired expansion was reached or until the apertures in which tool 20 may be inserted no longer permitted continued expansion. If tool 20" had been used, the interaction between wall 111" and 131" would have limited the degree of axial translation. In either tool embodiment, spring 140 is not significantly acting upon any structure at this juncture.

Upon further rotation of drive nut 60, both collet 100 and spindle 120 are drawn toward proximal or second end 42 of main body 30. This results in the loss of contact between abutment 118 and inner contacting surface 56 (see FIGS. 2 and 3). As best shown in FIG. 10, the result of this action is to decrease the working distance between contact portion 114 of shoulders 112 and outer contacting surface 52 of end cap 50. In this manner, the same means for expanding fingers 106 also operates to adjust the clamping distance between contact portion 114 and contacting surface 52. It should be noted that during the entire process, neither collet 100 nor spindle 120 have been subjected to any torque forces.

What is claimed:

1. A generally cylindrical collet for use with a temporary fastening tool comprising:
    a collet comprising a first end, a second end, an interior surface and an exterior surface, wherein the collet is sized to receive at least a portion of a spindle having a bulbous element at one end thereof, and has a plurality of finger elements at the first end and a main body abutment at the second end, wherein the finger elements are defined by a plurality of slots extending from the first end towards the second end, at least two of the fingers including shoulder portions present on the exterior surface proximate to the first end, and wherein a portion of the interior surface of at least two fingers is concave.

2. The collet of claim 1 wherein a portion of the interior surface of all fingers is concave.

3. The collet of claim 1 wherein all fingers have shoulder portions present on their respective exterior surfaces.

4. The collet of claim 1 wherein the main body abutment is a radially extending annulus.

5. The collet of claim 1 wherein the interior surface of the at least two fingers further comprises a planar annular wall to prevent translation of the bulbous element past a predetermined position.

6. The collet of claim 1 wherein the fingers converge towards each other in the absence of the bulbous element.

7. The collet of claim 1 wherein the finger elements comprise a bevel at the first end to assist in receiving the bulbous element.

8. A temporary fastener tool incorporating the collet of claim 1 and for use with an auxiliary rotation or translation generating device, the fastener tool comprising:
    an elongated, generally cylindrical main body having a first end, a second end, an interior surface and an exterior surface wherein at least the first end defines an orifice; and
    a spindle having a first end, a second end, and an exterior surface wherein a bulbous element having a distal end, a convex portion and a proximal end extends from the first end, at least a portion of the spindle is sized to fit and axially translate within the main body, and the second end is linkable to the auxiliary rotation or translation generating device
    wherein the collet is partially locatable in the main body and extends through the main body orifice.

9. The fastener tool of claim 8 wherein the collet abutment contacts the interior surface of the main body at the first end.

10. The fastener tool of claim 8 wherein the main body first end comprises a cap attachable to the main body, which defines the orifice.

11. The fastener tool of claim 8 wherein the auxiliary drive comprises a generally cylindrical drive element captively rotatable at the second end of the main body and having a first end, a second end, an interior surface and an exterior surface wherein at least a portion of the interior surface has threads formed thereon and wherein the spindle second end comprises complementary threads formed on the exterior surface thereof.

12. The fastener tool of claim 8 further comprising a biasing element acting directly or indirectly on the main body and the spindle.

13. The fastener tool of claim 12 wherein the biasing element selectively directly or indirectly acts on the main body and the spindle as a function of the distance between the main body and the spindle.

14. The fastener tool of claim 8 further comprising a bushing extending from the spindle second end and having an interior surface and an exterior surface wherein at least a portion of the exterior surface is sized to fit and axially translate within the main body.

15. The fastener tool of claim 14 further comprising anti-rotation means for preventing rotation of the bushing.

16. The fastener tool of claim 8 further comprising a bushing extending from the spindle second end and having an interior surface and an exterior surface wherein at least a portion of the exterior surface is sized to fit and axially translate within the main body and wherein threads formed on the exterior surface thereof interface with the auxiliary rotation or translation generating device.

17. The fastener tool of claim 16 wherein the second end of the spindle includes threads for engaging a threaded bore defined by a first end of the bushing.

18. The fastener tool of claim 16 wherein at least one portion of the interior surface of the main body comprises, in cross section, a non-circular geometric shape, and wherein at least one portion of the exterior surface of the bushing comprises, in cross section, a non-circular geometric shape of a type to axially translate within the at least one portion of the interior surface of the main body.

19. The fastener tool of claim 18 wherein the at least one portion of the exterior surface of the bushing comprising, in cross section, a non-circular geometric shape is located generally at the first end.

20. The fastener tool of claim 8 further comprising anti-rotation means for preventing rotation of the spindle.

21. The fastener tool of claim 8 wherein at least one portion of the interior surface of the main body comprises, in cross section, a non-circular geometric shape, and wherein at least one portion of the exterior surface of the spindle comprises, in cross section, a non-circular geometric shape of a type to axially translate within the at least one portion of the interior surface of the main body.

22. The fastener tool of claim 21 wherein the at least one portion of the exterior surface of the spindle comprising, in cross section, a non-circular geometric shape is located between the first end of the second end thereof.

23. The fastener tool of claim 8 wherein the spindle is selected from the group consisting of a unitary member having a single diameter from the first end to the second end; a unitary member having at least two distinct diameters from the first end to the second end, the smaller diameter being adjacent to the bulbous element; and a multi-piece member having at least two distinct diameters from the first end to the second end, the smaller diameter piece being adjacent to the bulbous element.

24. The fastener tool of claim 8 wherein the bulbous element is generally spherical apart from a spindle contacting portion at the proximal end thereof.

25. The fastener tool of claim 24 wherein the portion of the interior surface of the at least two fingers is complementary to a portion of the exterior surface contours of the bulbous element.

26. The fastener tool of claim 8 wherein the bulbous element is a generally frusto-spheroid comprising a generally spherical portion at the distal end and a generally planar annular portion forming a wall at the proximal end.

27. The fastener tool of claim 26 wherein the portion of the interior surface of the at least two fingers has both concave and planar surfaces complementary to selective portions of the exterior surface contours of the bulbous element.

28. The fastener tool of claim 8 wherein the plurality of fingers converge towards one another in the absence of the bulbous element.

29. The fastener of claim 8 wherein the shoulder portions comprise planar portions orthogonal to the collet axis for contacting a piece to be fastened.

30. The fastener tool of claim 8 wherein the finger elements comprise a bevel at the first end to assist in receiving the bulbous element.

31. The fastener tool of claim 8 wherein the auxiliary drive comprises a generally cylindrical drive element captively rotatable at the second end of the main body and having a first end, a second end, an interior surface and an exterior surface wherein at least a portion of the interior surface has threads formed thereon and wherein the spindle second end comprises complementary threads formed on the exterior surface thereof; and wherein at least one portion of the interior surface of the main body comprises, in cross section, a non-circular geometric shape, and wherein at least one portion of the exterior surface of the spindle comprises, in cross section, a non-circular geometric shape of a type to axially translate within the at least one portion of the interior surface of the main body.

32. The fastener tool of claim 31 further comprising a biasing element acting directly or indirectly on the main body and the spindle.

33. The fastener tool of claim 32 wherein the spindle is selected from the group consisting of a unitary member having a single diameter from the first end to the second end; a unitary member having at least two distinct diameters from the first end to the second end, the smaller diameter being adjacent to the bulbous element; and a multi-piece member having at least two distinct diameters from the first end to the second end, the smaller diameter piece being adjacent to the bulbous element.

34. The fastener tool of claim 33 wherein the bulbous element is one of generally spherical apart from the spindle contacting portion at the proximal end thereof, or generally frusto-spherical having a generally spherical portion at the distal end thereof and generally planar annular portion forming a wall at the proximal end thereof.

35. The fastener tool of claim 34 wherein the plurality of fingers converge towards one another in the absence of the bulbous element.

36. The fastener tool of claim 35 wherein the shoulder portions comprise planar portions orthogonal to the collet axis for contacting a piece to be fastened.

37. The fastener tool of claim 36 wherein the collet abutment contacts the interior surface of the main body at the first end.

38. The fastener tool of claim 8 wherein the shoulder portions comprise planar portions orthogonal to the collet axis for contacting a piece to be fastened.

39. A temporary fastener tool incorporating the collet of claim 1 and for use with an auxiliary rotation or translation generating device, the fastener tool comprising:
   an elongated, generally cylindrical main body having a first end, a second end, an interior surface and an exterior surface wherein at least the first end defines an orifice;
   a spindle having a first end, a second end, and an exterior surface wherein a bulbous element having a distal end and a proximal end extends from the first end, and at least a portion of the spindle is sized to fit and axially translate within the main body; and
   anti-rotation means linking the main body with the spindle for preventing rotation of the spindle relative to the main body
   wherein the collet extends through the main body orifice.

40. The fastener tool of claim 39 wherein the auxiliary drive comprises a generally cylindrical drive element captively rotatable at the second end of the main body and having a first end, a second end, an interior surface and an exterior surface wherein at least a portion of the interior surface has threads formed thereon and wherein the spindle second end comprises complementary threads formed on the exterior surface thereof.

41. The fastener tool of claim 39 further comprising a biasing element acting directly or indirectly on the main body and the spindle.

42. The fastener tool of claim 41 wherein the biasing element selectively directly or indirectly acts on the main body and the spindle as a function of the distance between the main body and the spindle.

43. The fastener tool of claim 39 further comprising a bushing extending from the spindle second end and having an interior surface and an exterior surface wherein at least a portion of the exterior surface is sized to fit and axially translate within the main body.

44. The fastener tool of claim 43 wherein the anti-rotation means is part of the bushing.

45. The fastener tool of claim 43 wherein at least one portion of the interior surface of the main body comprises, in cross section, a non-circular geometric shape, and wherein at least one portion of the exterior surface of the bushing comprises, in cross section, a non-circular geometric shape of a type to axially translate within the at least one portion of the interior surface of the main body.

46. The fastener tool of claim 45 wherein the at least one cross section of the exterior surface of the bushing comprising a non-circular geometric shape is located generally at the first end.

47. The fastener tool of claim 39 further comprising a bushing extending from the spindle second end and having an interior surface and an exterior surface wherein at least a portion of the exterior surface is sized to fit and axially translate within the main body and wherein threads formed on the exterior surface thereof interface with the auxiliary rotation or translation generating device.

48. The fastener tool of claim 47 wherein the second end of the spindle includes threads for engaging a threaded bore defined by a first end of a bushing.

49. The fastener tool of claim 39 wherein the anti-rotation means is part of the spindle.

50. The fastener tool of claim 39 wherein at least one portion of the interior surface of the main body comprises, in cross section, a non-circular geometric shape, and wherein at least one portion of the exterior surface of the spindle comprises, in cross section, a non-circular geometric shape of a type to axially translate within the at least one portion of the interior surface of the main body.

51. The fastener tool of claim 50 wherein the at least one cross section of the exterior surface of the spindle comprising a non-circular geometric shape is located between the first end of the second end thereof.

52. The fastener tool of claim 39 wherein the spindle is selected from the group consisting of a unitary member having a single diameter from the first end to the second end; a unitary member having at least two distinct diameters from the first end to the second end, the smaller diameter being adjacent to the bulbous element; and a multi-piece member having at least two distinct diameters from the first end of the second end, the smaller diameter piece being adjacent to the bulbous element.

53. The fastener tool of claim 39 wherein the bulbous element is generally spherical apart from a spindle contacting portion at the proximal end thereof.

54. The fastener tool of claim 53 wherein the portion of the interior surface of the at least two fingers is complementary to a portion of the exterior surface contours of the bulbous element.

55. The fastener tool of claim 39 wherein the bulbous element is a generally frusto-spheroid comprising a generally spherical portion at the distal end and a generally planar annular portion forming a wall at the proximal end.

56. The fastener tool of claim 55 wherein the portion of the interior surface of the at least two fingers has both concave and planar surfaces complementary to selective portions of the exterior surface contours of the bulbous element.

57. The fastener tool of claim 39 wherein the plurality of fingers converge towards one another in the absence of the bulbous element.

58. The fastener tool of claim 39 wherein the finger elements comprise a bevel at the first end to assist in receiving the bulbous element.

* * * * *